(12) United States Patent
Koizumi

(10) Patent No.: US 9,019,534 B2
(45) Date of Patent: Apr. 28, 2015

(54) IMAGE FORMING APPARATUS AND IMAGE FORMING METHOD INVOLVING REUSE FUNCTION

(71) Applicant: Shinji Koizumi, Shizuokoa-ken (JP)

(72) Inventor: Shinji Koizumi, Shizuokoa-ken (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 52 days.

(21) Appl. No.: 13/693,790

(22) Filed: Dec. 4, 2012

(65) Prior Publication Data

US 2013/0155452 A1 Jun. 20, 2013

Related U.S. Application Data

(60) Provisional application No. 61/576,006, filed on Dec. 15, 2011.

(51) Int. Cl.
*G06F 3/12* (2006.01)
*H04N 1/44* (2006.01)

(52) U.S. Cl.
CPC ...... *G06F 3/1237* (2013.01); *H04N 2201/3246* (2013.01); *H04N 1/4406* (2013.01)

(58) Field of Classification Search
USPC .......................................... 358/1.15
See application file for complete search history.

(56) References Cited

U.S. PATENT DOCUMENTS

| | | | | |
|---|---|---|---|---|
| 2007/0211287 A1* | 9/2007 | Fujii | .......... | 358/1.16 |
| 2008/0218792 A1* | 9/2008 | Murata et al. | .......... | 358/1.15 |
| 2009/0257078 A1* | 10/2009 | Sawada et al. | .......... | 358/1.14 |
| 2009/0316187 A1* | 12/2009 | Kajikawa | .......... | 358/1.15 |
| 2010/0123932 A1* | 5/2010 | Nakamura | .......... | 358/1.15 |
| 2014/0126015 A1* | 5/2014 | Kaneko | .......... | 358/1.15 |

FOREIGN PATENT DOCUMENTS

| | | |
|---|---|---|
| JP | 2005-349649 | 12/2005 |
| JP | 2009-141655 | 6/2009 |
| JP | 2011-118843 | 6/2011 |

* cited by examiner

*Primary Examiner* — Benjamin O Dulaney
(74) *Attorney, Agent, or Firm* — Amin, Turocy & Watson, LLP

(57) ABSTRACT

According to one embodiment, an image forming apparatus includes an authenticating section, a permitting section, and an input section. The authenticating section authenticates a user. The permitting section permits the user authenticated by the authenticating section to execute a new job using data associated with the user and stored concerning already-completed jobs. The input section enables the user to change at least one of conditions for execution of the new job with respect to the already-completed jobs permitted by the permitting section and input the condition.

8 Claims, 10 Drawing Sheets

IMAGE FORMING APPARATUS AND IMAGE FORMING METHOD INVOLVING REUSE FUNCTION

CROSS-REFERENCE TO RELATED APPLICATIONS

This application is based upon and claims the benefit of priority from U.S. Provisional Application No. 61/576,006 filed on Dec. 15, 2011; the entire contents of which are incorporated herein by reference.

FIELD

Embodiments described herein relate generally to an image forming apparatus and an image forming method involving a reuse function.

BACKGROUND

If the number of participants in a meeting or the like suddenly increases when materials equal to the number of participants are prepared beforehand for the meeting or the like by printing (printout) or copying, it is necessary to transmit printing data again and print the materials by the number of additional participants or prepare the materials by additionally copying the materials.

Similarly, in facsimile transmission, scan to email, and the like, if the same data needs to be transmitted to another destination after the completion of a job, it is necessary to read and transmit document images again.

As explained above, if the materials prepared beforehand by the number of participants are suddenly added, it is necessary to transmit again and print the materials by the number of additional participants or prepare the materials by additionally copying the materials. Similarly, in facsimile transmission, scan to email, and the like, it is necessary to read and transmit document images again.

DETAILED DESCRIPTION

Figure 1:
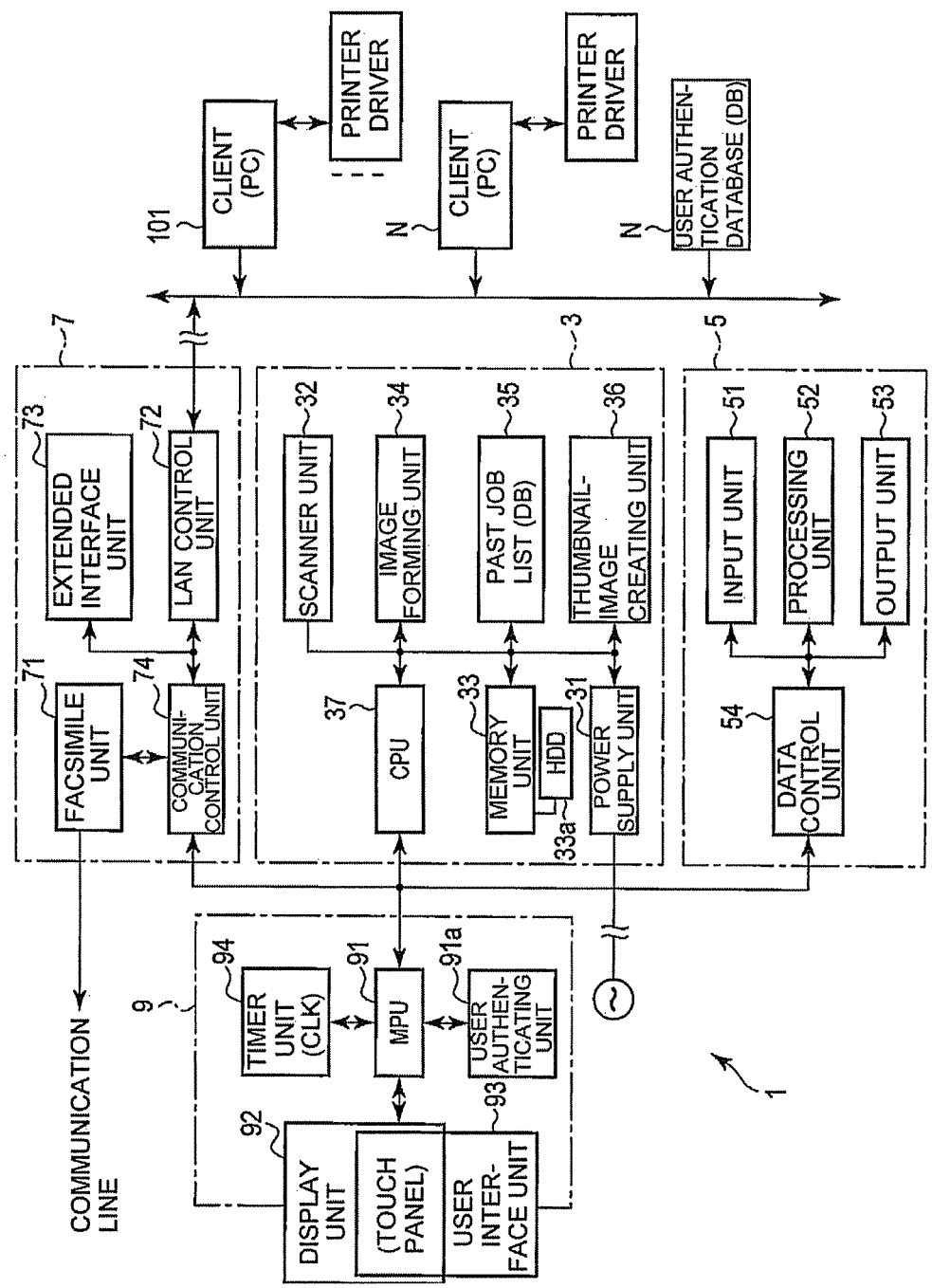
FIG. 1 is a diagram of an example of an image forming apparatus according to an embodiment.

In general, according to one embodiment, an image forming apparatus includes an authenticating section, a permitting section, and an input section. The authenticating section authenticates a user. The permitting section permits the user authenticated by the authenticating section to execute a new job using data associated with the user and stored concerning already-completed jobs. The input section enables the user to change at least one of conditions for execution of the new job with respect to the already-completed jobs permitted by the permitting section and input the condition.

An embodiment is explained below with reference to the accompanying drawings.

An image forming apparatus (a multifunction peripheral, hereinafter simply referred to as MFP) 1 includes at least an image forming section 3, a data managing section 5, a communication control section 7, and a system control section 9. The MFP 1 is connected to an arbitrary number of clients (users) such as personal computers (PCs) 101 to N through a LAN (Local Area Network) control unit 72 (a communication control section 7) explained below.

The image forming section 3 visualizes images and characters on the basis of data of an arbitrary format and outputs the images and the characters onto sheet media. The data managing section 5 receives data and manages the data for execution of a job such as print output or storage. The communication control section 7 manages transmission and reception of data between the MFP 1 and a communication line (a network). The system control section 9 controls the operation of the image forming section 3, the data managing section 5, and the communication control section 7, i.e., the operation of the MFP 1.

The image forming section 3 includes at least a power supply unit 31, a scanner unit 32, a memory unit 33, an image forming unit 34, a past job list (DB, Data Base) 35, a thumbnail-image creating unit 36, and a process control unit 37 including a CPU (a microprocessor) and configured to control the units of the image forming section 3.

The power supply unit 31 is connected to a commercial power supply. The power supply unit 31 generates a secondary voltage used for the operation of the MFP 1 from a primary (input) voltage. It goes without saying that an input allowable current value (upper limit) is managed concerning the primary voltage.

If information such as images, characters, or shapes and colors which is visualized by the image forming unit 34 and outputted onto sheet media is formed in a non-data format, the scanner unit 32 outputs the information as image data. The scanner unit 32 acquires an electric signal corresponding to the intensity of reflected light (image light) of light irradiated on a sheet-like document or a solid object including the information and converts the electric signal into image data.

The memory unit 33 stores, for example, the image data acquired by the scanner unit 32 (image data read for copying or image data used for transmission by a facsimile unit 71) and image data input from the outside such as output data from a personal computer (PC) or facsimile reception data. The memory unit 33 stores computer programs, applications (software), and the like as well.

The image forming unit 34 visualizes the image data and outputs the image data onto sheet media. As a method for the visualization, an electrostatic transfer system for visualizing the image data using a toner and a direct recording system (inkjet) for visualizing the image data using ink are often used. A hot stamp or the like for output of special colors (gold and silver) may be used together with the method.

The image forming section 3 stores an image output by the image forming unit 34. The image forming section 3 includes a supply mechanism for the sheet media supplied to the image forming unit 34.

The past job list (DB) 35 stores the image data read by the scanner unit 32, the output data from the PC, the facsimile reception data, and the like. For example, the memory unit 33 or a HDD (Hard Disk Drive, a large-capacity storage device) 33a connected to the memory unit 33 stores data itself corresponding to a list stored by the past job list 35.

Concerning past jobs (image data) corresponding to a reuse instruction by a user and present in the list stored by the past job list 35, the thumbnail-image creating unit 36 reads out thumbnail (preview) images of a predetermined magnification from the memory unit 33 through a data control unit 54 explained below and generates the thumbnail images. The thumbnail images are images for displaying, on a display 92 of the system control section 9, data for at least one page of the image data read by the scanner unit 32, the output data from the PC, or the facsimile reception data. Therefore, the display 92 can display the thumbnail images of the past jobs instructed by the user. The thumbnails (images) displayed by the display 92 can be (desirably) checked on, for example, a printer driver screen of (displayed by) a client located on a network as well.

The data managing section 5 includes at least a data input unit 51, a data processing unit 52, a data output unit 53, and a data control unit 54. The data input unit 51 receives image data to be processed by the data processing unit 52. The data processing unit 52 processes the data received by the data input unit 51 for execution of a job such as print output or storage. The data output unit 53 outputs the data processed by the data processing unit 52 in a format specified by the job. The data control unit 54 controls exchange of data among the data input unit 51, the data processing unit 52, and the data output unit 53. The data control unit 54 retrieves, on the basis of a reuse instruction by the user, past jobs stored by the past job list (DB) 35, reads out past job data from the past job list 35 according to a retrieval result, and sets a display format of the past job data in order to, for example, display the past job data as a past job list or display the past jobs as thumbnails.

The communication control section 7 includes at least a facsimile unit 71 connected to a public communication line and configured to receive or transmit facsimile (FAX) data, a LAN control unit 72 connected to an external network, for example, a LAN (local area network) and configured to receive data from the network or transmit data to the network, an extended interface unit 73 adapted to, for example, a USB (universal serial bus) standard and configured to receive data from a partner connected to the MFP 1 or transmit data to the partner, and a communication control unit 74 configured to control, for example, communication with the partner by each of the facsimile unit 71, the LAN control unit 72, and the extended interface unit 73, input and output of data, and parallel processing. As explained above, the MFP 1 is connected to an arbitrary number of clients (users) such as the personal computers (PCs) 101 to N through the LAN control unit 72. The MFP 1 functions as a network printer as well.

The system control unit 9 includes at least a main control block (an MPU) 91, a display unit (a display) 92 including an input section (a switch or button group) or a touch panel (an input panel), and a user interface unit (an operation section) 93 to which the touch panel is connected.

The MPU 91 is connected to the user interface unit 93. The MPU 91 receives an operation input from the display unit (the touch panel) 92 for executing the start and the stop of the operation of the sections, facsimile transmission, setting of the number of copies, or display of a past job list or thumbnail images for reuse. The MPU 91 supplies a command (a control signal) corresponding to the operation input to the control units of the sections corresponding to the operation input, i.e., the process control unit (the CPU) 37, the data control unit 54, the communication control unit 74, and the like and controls the sections. The MPU 91 is connected to a user authenticating unit 91a. The MPU 91 receives an authentication input for user authentication conforming to limitation of usable functions for each user set in advance and a type of a job and an input of, for example, authentication information supplied by an ID card of a contact type or a non-contact type, authentication information by user peculiar information of biometrics (fingerprint, vein, iris (pupil), etc.), or authentication information such as a password input using the touch panel 92.

The touch panel 92 detects an instruction input by a finger of the user and instructs the MPU 91 to start up, for example, start of copying or scanning, display of scan data or received facsimile data, and display of a past job list or thumbnail images for reuse.

The MPU 91 is connected to a timer unit 94. The timer unit 94 stores year (yyyy), month (mm), day (DD), hour (HH), and minute (MM) with reference to a clock generated by a clock generating unit (CLK) incorporated therein such that the year, month, day, hour, and minute can be used for, for example, display of reception date and time and transmission date and time of facsimile documents, and scan date and time by a scanner, and storage in a file (attachment to a file name). The clock generating unit (CLK) may be provided in the system control unit 9 for the operation of the MPU 91. For counting of time or storage of time data by the timer unit 94, for example, a frequency of a commercial power supply input to the power supply unit 31 of the image forming section 3 may be used. Alternatively, for example, time data (a time tone service signal) included in a broadcast signal, which is a space wave, may be directly received.

The MPU 91 compares user authentication information such as a password and a user name input through the touch panel (the display unit) 92 (the user interface unit 93) or authentication information input through the user authenticating unit 91a with a password and a user name or authentication information in an authentication database (DB) 111 stored in advance. The MPU 91 determines the operation of the MFP 1, for example, setting of the number of outputs of output images including color images, setting of the number of outputs to an unregistered and unpermitted general user, and determination that a user who instructs reuse is a user who previously executed copying, output of a print, facsimile transmission, and the like of data to be reused. The MPU 91 manages, according to an authentication result (or a collation result of the password and the user name) by the user authenticating unit 91a that manages the use of the MFP 1 according to the setting, concerning the user currently using the MFP 1, propriety of reuse of past jobs stored in the past job list 35, a usable range of the MFP 1, and the like.

When a past job is reused, i.e., an already-completed job is executed again according to the control by the MPU 91, for example, in the data control unit 54, as firmware of the process control unit 37, or as one of computer programs stored in the memory unit 33, for example, concerning copies or printouts, the number of the copies and the printouts can be arbitrarily changed. Concerning facsimile transmission, a transmission partner of the facsimile transmission (a facsimile number) can be arbitrarily changed. Concerning scan to mail, a transmission partner of the scan to mail can be arbitrarily changed. The MPU 91 can also store the computer programs. However, when a storage period (time) of the past job expires, past job data stored by the HDD 33a or the memory unit 33 and the past job list 35 for enabling the past job data to be specified are erased. In this case, the storage period can be easily managed using the time (the date and time and the date)

managed by the timer unit 94. A user permitted to reuse the past job or an administrator of the MFP 1 can arbitrarily set or change the storage period (time) of the past job. The storage period can be set for each job.

Figure 2:
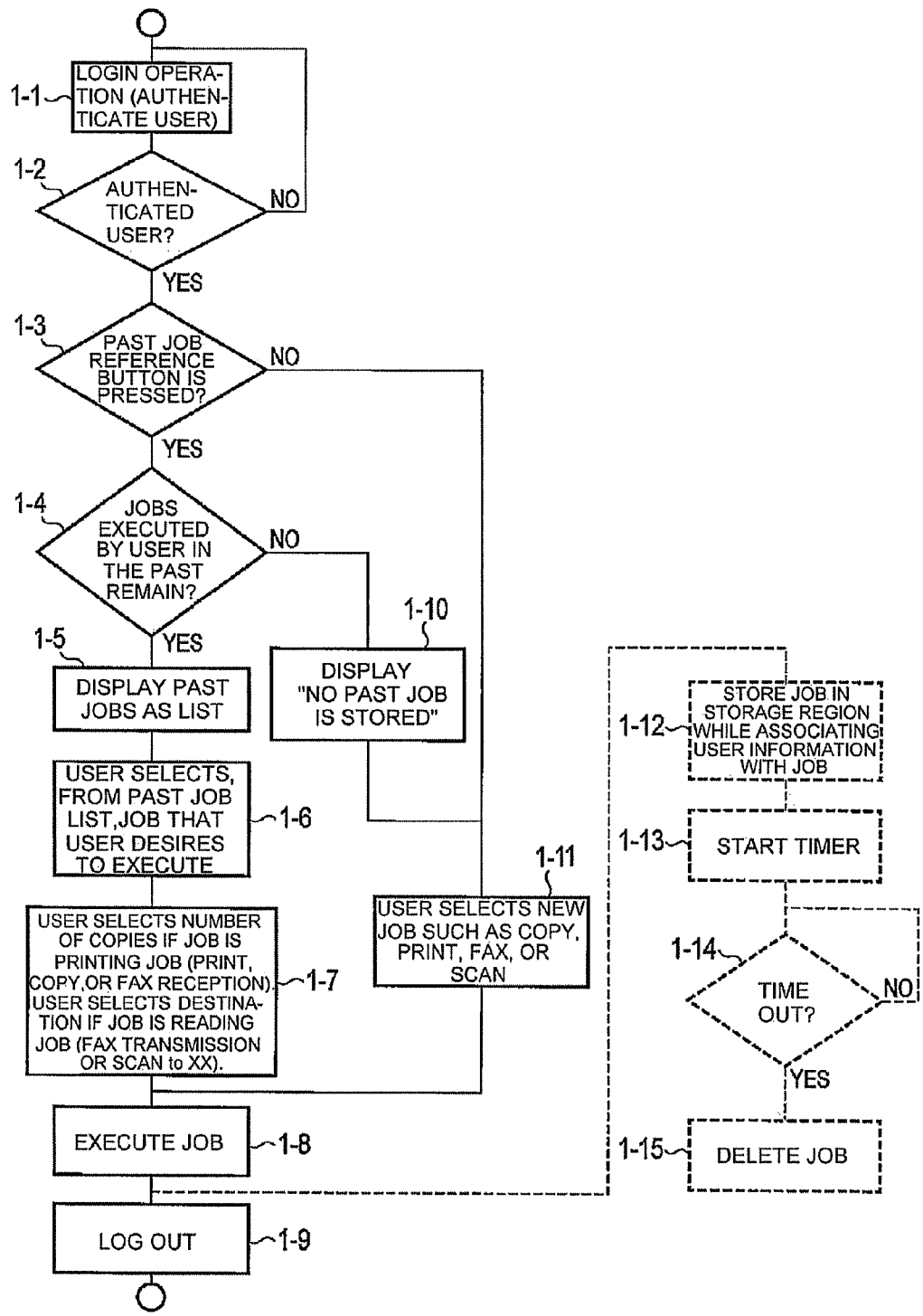
FIG. 2 is a flowchart for explaining an example of a reuse method in the image forming apparatus.

FIG. 2 is a flowchart for explaining an example of a procedure of execution of a past job for a user authenticated (who obtains authentication) for permission to reuse the past job (allowed to execute an already-completed job again).

Figure 3:
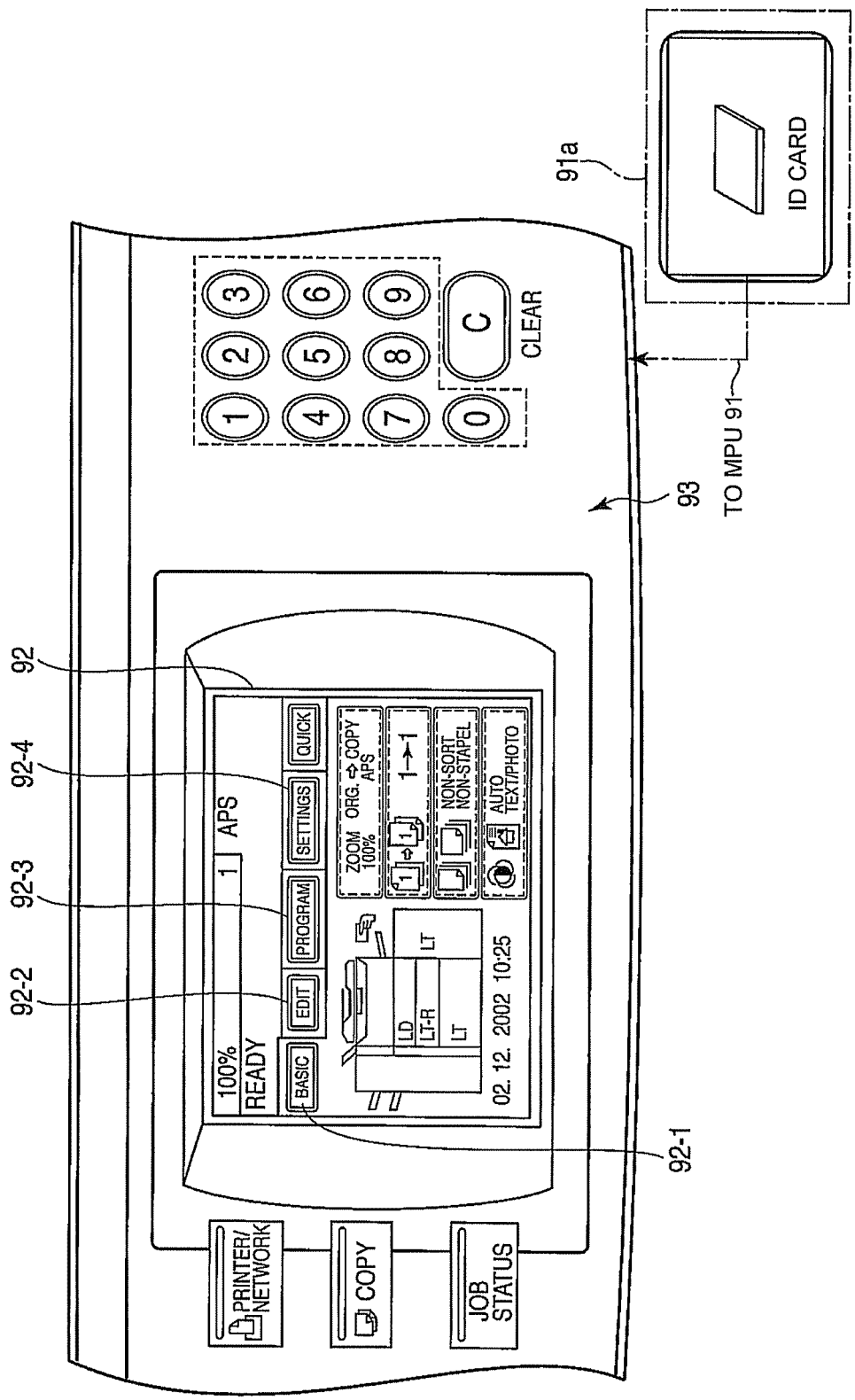
FIG. 3 is a diagram of an example of a form (panel display) of reuse in the image forming apparatus.
Figure 4:
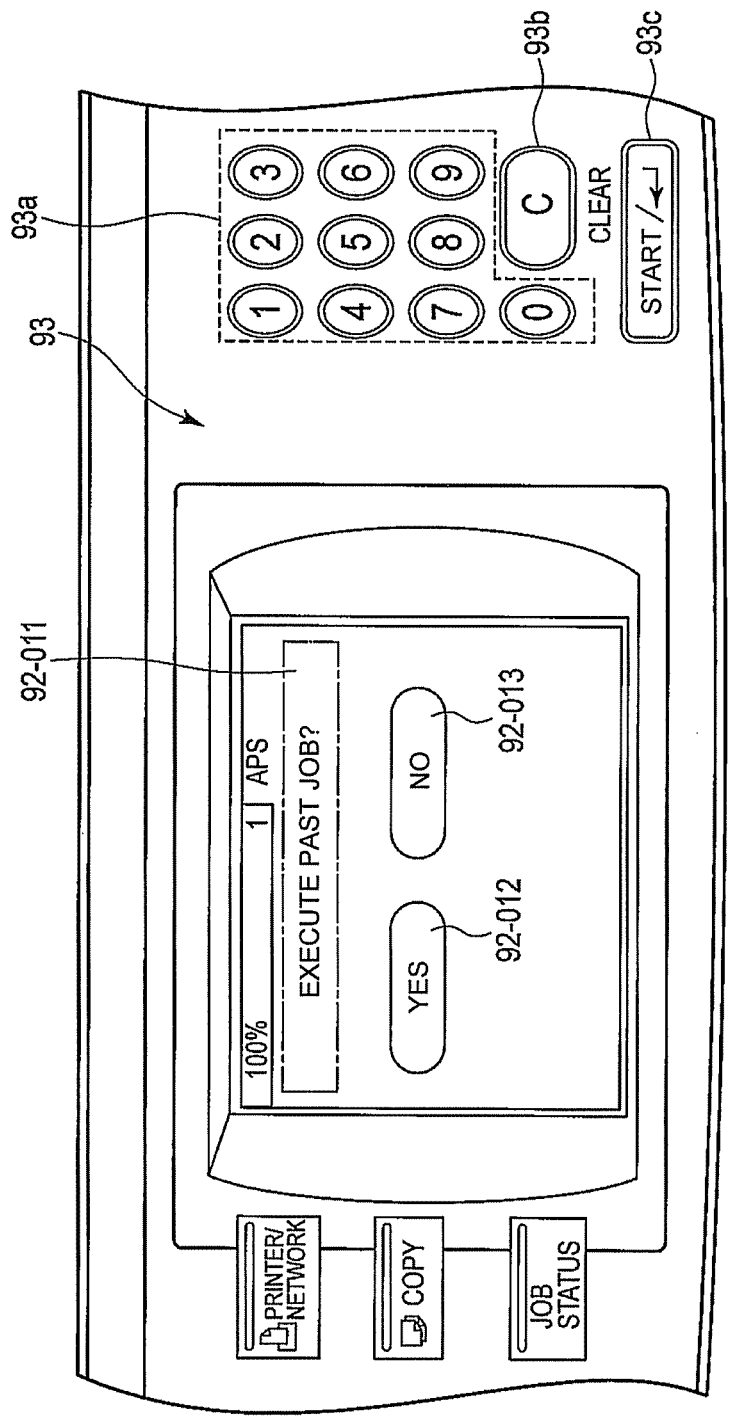
FIG. 4 is a diagram of an example of a form (panel display) of reuse in the image forming apparatus.

In a state in which a standby screen after the completion of startup processing or an arbitrary job (copying, printing, facsimile transmission, or scanning) is displayed as shown in FIG. 3, login operation by a user, for example, input of authentication information of the user by an ID card is performed [1-1]. The MFP 1 confirms according to personal authentication based on the input authentication information that the user is a user who should be authenticated (i.e., a user who instructs reuse is a user who previously executed copying, output of a print, facsimile transmission, or the like of data to be reused) [1-2]. Then, as shown in FIG. 4, the MFP 1 displays the following messages: a message 92-011 for urging the user to perform the next operation such as 'execute past job?", an input button indication corresponding to the message, i.e., a 'Yes' indication 92-012 for enabling input of a control input corresponding to "execute", and a 'No' indication 92-013 for enabling input of a control input corresponding to 'cancel/return to immediately preceding screen/ (start of) new job' or the like. However, the MFP 1 does not display the indication for urging execution of a past job for users other than a user who is authenticated to log in to the MFP 1.

Figure 5:
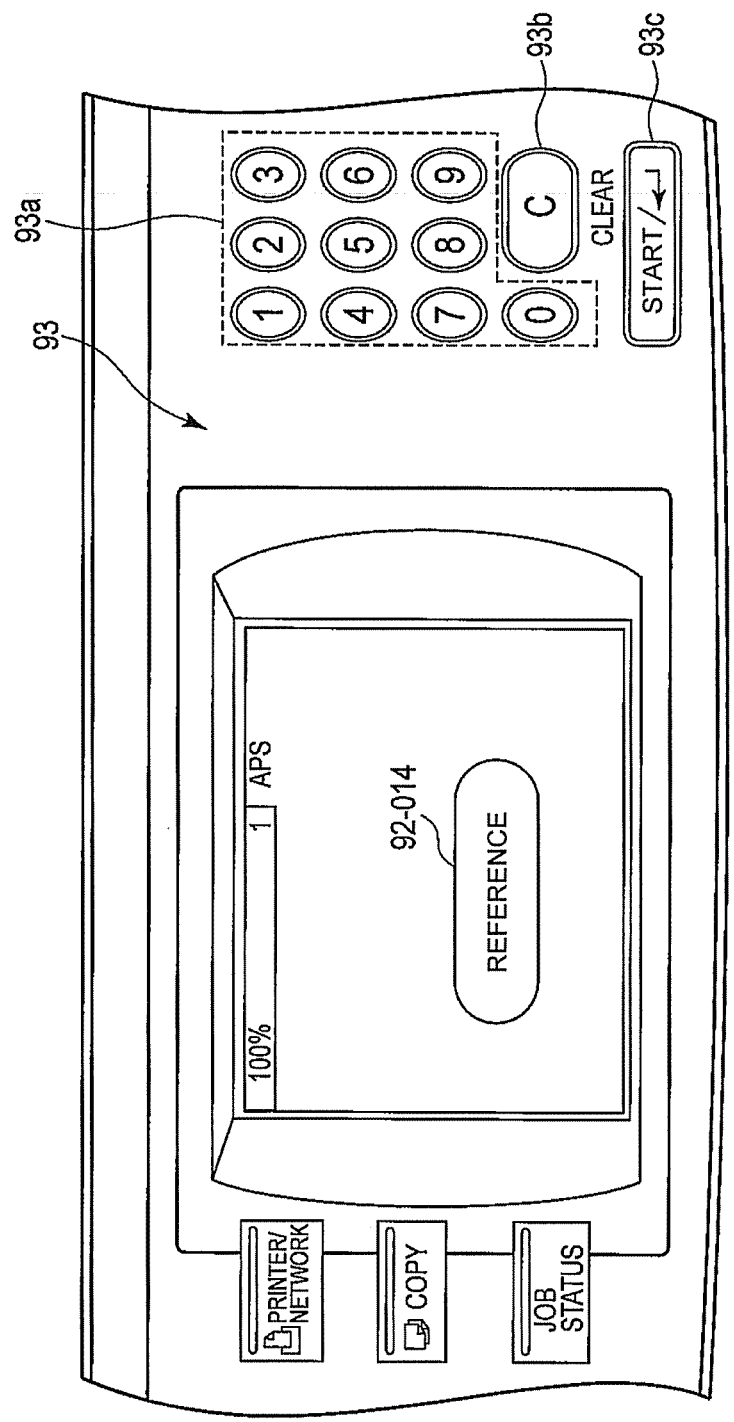
FIG. 5 is a diagram of an example of a form (panel display) of reuse in the image forming apparatus.

When the user instructs (inputs) the past job execution through the 'Yes' indication 92-012, if past jobs are present, as shown in FIG. 5, the MFP 1 displays a 'reference' indication 92-014 for enabling input of a control input for displaying a list or thumbnails of the past jobs [1-3]. If a control input corresponding to "cancel or (start of) new job" is input by the user through the 'No' indication 92-013[1-3 (NO)], the MFP 1 executes a (new) job such as printout, copying, facsimile transmission, facsimile reception, or scanning of print (output) data transmitted by the user in advance [1-11].

Figure 6:
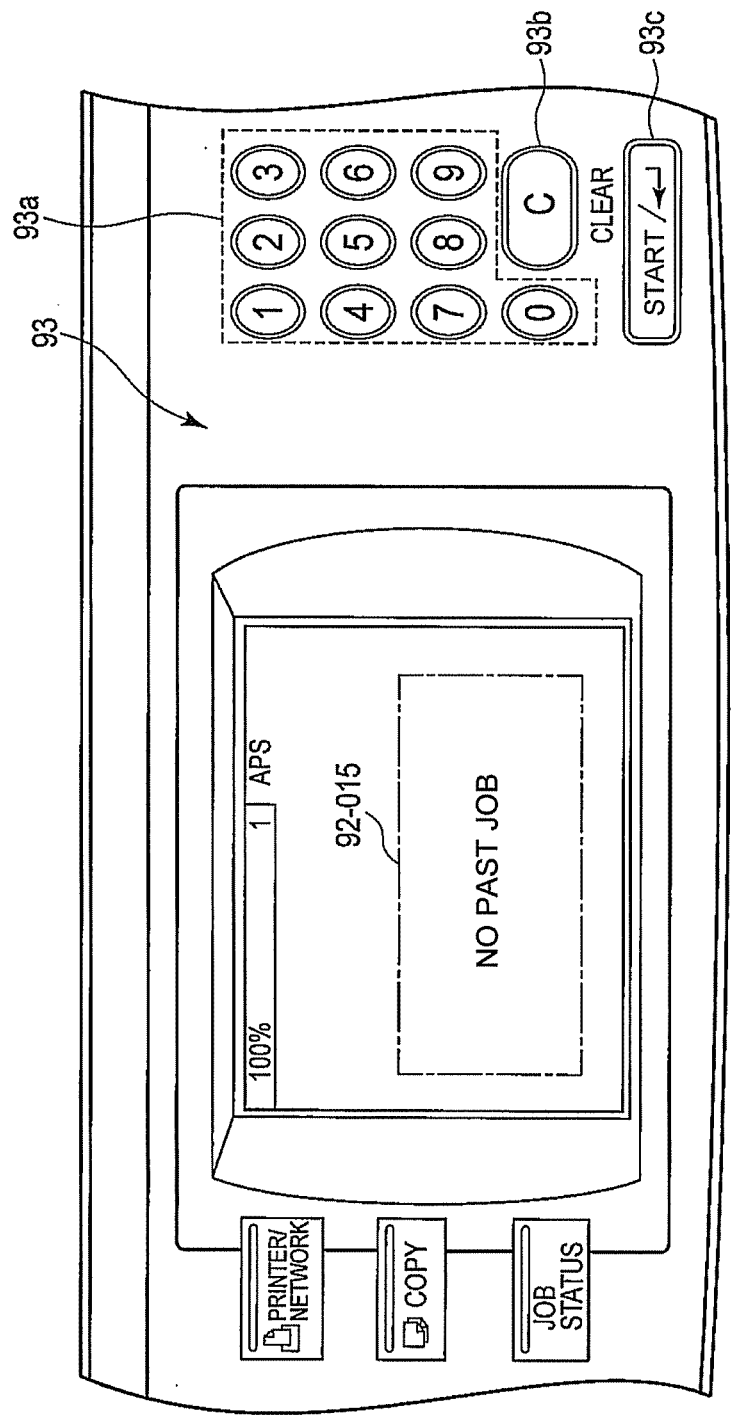
FIG. 6 is a diagram of an example of a form (panel display) of reuse in the image forming apparatus.

If the authenticated user instructs execution of a past job from the 'reference' indication 92-014[1-3 (YES)], the MFP 1 selects past job execution and checks whether jobs already executed by the user (in the past) remain [1-4]. If jobs already executed by the user (in the past) do not remain [1-4 (NO)], for example, as shown in FIG. 6, the MFP 1 displays a message 92-015 for urging the next operation such as 'no past job' [1-10].

Figure 7:
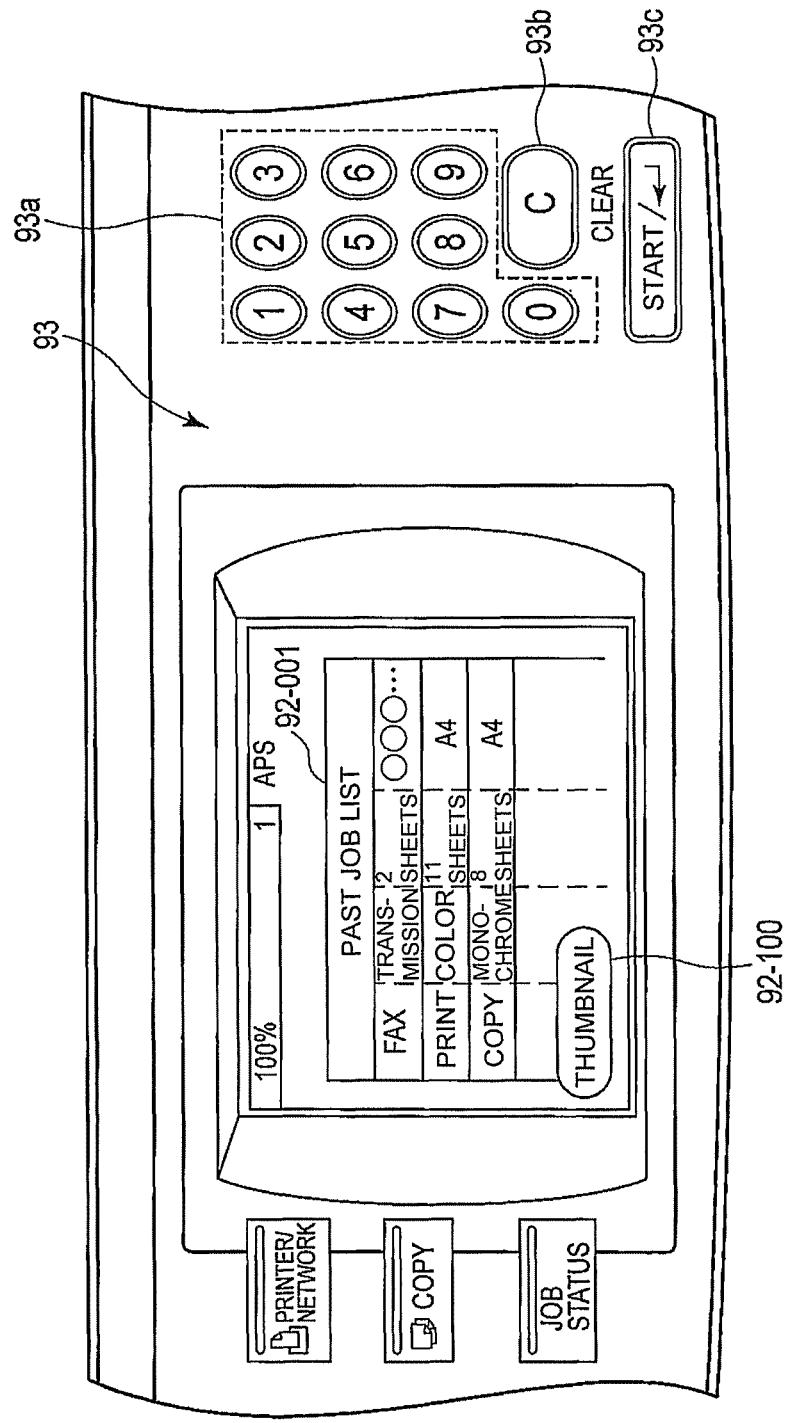
FIG. 7 is a diagram of an example of a form (panel display) of reuse in the image forming apparatus.

If jobs executed by the user in the past remain [1-4 (YES)], for example, as shown in FIG. 7, the MFP 1 displays the past jobs on the touch panel (the display unit) 92 as a past job list [92-001] [1-5].

Figure 8:
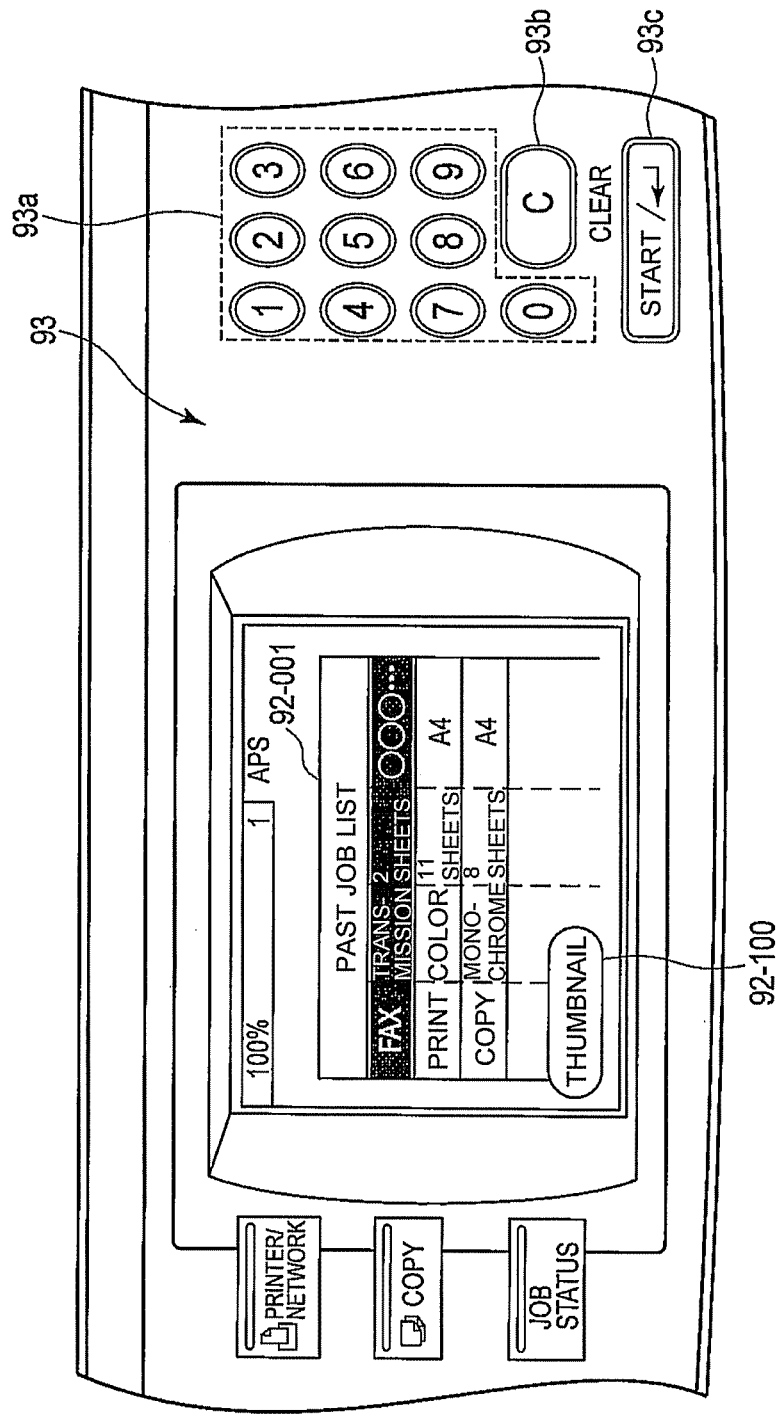
FIG. 8 is a diagram of an example of a form (panel display) of reuse in the image forming apparatus.

For example, if the user selects "FAX transmission display", as shown in FIG. 8, the MFP 1 changes a space 92-101 of the past job list "92-001" to reversed display (display by a different color). For example, a transmission partner, i.e., a facsimile number of a partner can be changed (e.g., it is indicated by blinking display or the like of the display of a FAX number space 92-1D1 that the transmission partner can be changed). Consequently, the user can directly input a facsimile number of a new transmission partner using a number key (a ten key) 93a with which a control input corresponding to, for example, numbers "0" to "9" can be input. However, for example, if a "start/enter key" 93c is turned on, a facsimile is transmitted to a partner to which the facsimile is already transmitted displayed immediately before the turn-on of the "start/enter key" 93c. Therefore, in order to prevent the redundant (double) transmission, if a new facsimile number is not input, it is also possible to display a (alert) message such as 'transmission to same transmission partner?' If a facsimile number (a transmission partner) is stored in, for example, an address book or a transmission list (a transmission memory), it is also possible to select (change) the facsimile number from the address book (or the list or memory)<<Example 1 [1-6] to [1-7]>>.

Figure 9:
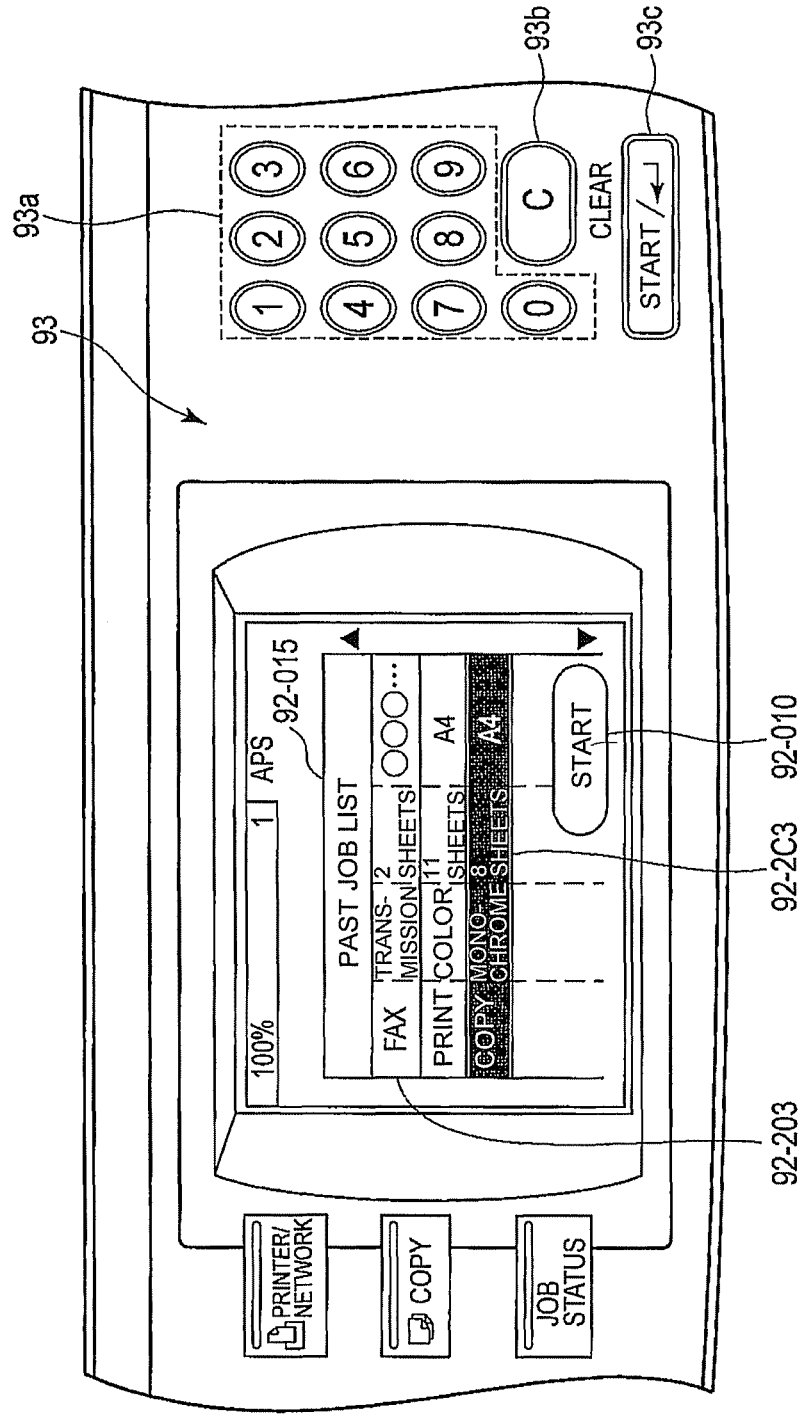
FIG. 9 is a diagram of an example of a form (panel display) of reuse in the image forming apparatus.

For example, if the user selects "copy monochrome display", as shown in FIG. 9, the MFP 1 changes a space 92-203 of the past job list "92-001" to reversed display (display by a different color). For example, the number of copies (display) can be changed (e.g., it is indicated by blinking display or the like of the display of a number-of-copies space 92-2C3 that the number of copies can be changed). Consequently, the user can directly set a new number of copies using the ten key (the number key) 93a. For example, if the "start/enter key" 93c is turned on, the MFP 1 repeats copying of the number of copies displayed immediately before the turn-on of the "start/enter key" 93c. Therefore, in order to prevent creation of unnecessary copies, if a new number of copies is not input, it is also possible to display a "alert" message such as 'same number of copies is OK?'<<Example 2[1-6] to [1-7]>>.

Thereafter, the MFP 1 executes the new job set in <<example 1>> or <<example 2>> according to, for example, turn-on of the "start/enter key" 93c or input of a control instruction from a 'start' indication or the like displayed on the touch panel 92 [1-8]. If the subsequent operation is not executed for a predetermined time, the user logs out (logs off). The MFP 1 executes a job from another user [1-9]

If a past job is printout, a display name (a display example) displayed by the past job list "92-001" may be a text name or an extension (a file identifier).

On the other hand, if the user executes a new job [1-3 (NO)] to [1-11], after the "logout", in order to manage the (executed) new job as a past job, the MFP 1 associates user information with the new job, stores the job in the memory unit 33 or the HDD 33a, and updates the database (the past job list) 35. In other words, the MFP 1 stores various kinds of setting such as data (image data) of completed jobs, job registration (execution) date and time, the number of printed copies, and a destination in a storage region (the memory unit 33 or the HDD 33a) [1-12]. The MFP 1 starts management of a storage period by the timer unit 94 [1-13].

At a point when the set storage period expires, i.e., at timeout [1-14 (YES)], the MFP 1 deletes (erases) the stored job (past job). The user can arbitrarily set the storage period (time until the timeout) [1-15]. The update of the database (the past job list) 35 after the job completion [1-12] is not limited to be performed after the completion of the new job. If the update is executed concerning the immediately preceding job, it is easy to perform, for example, second additional copying or printout and facsimile transmission or mail transmission to a different transmission partner.

Figure 10:
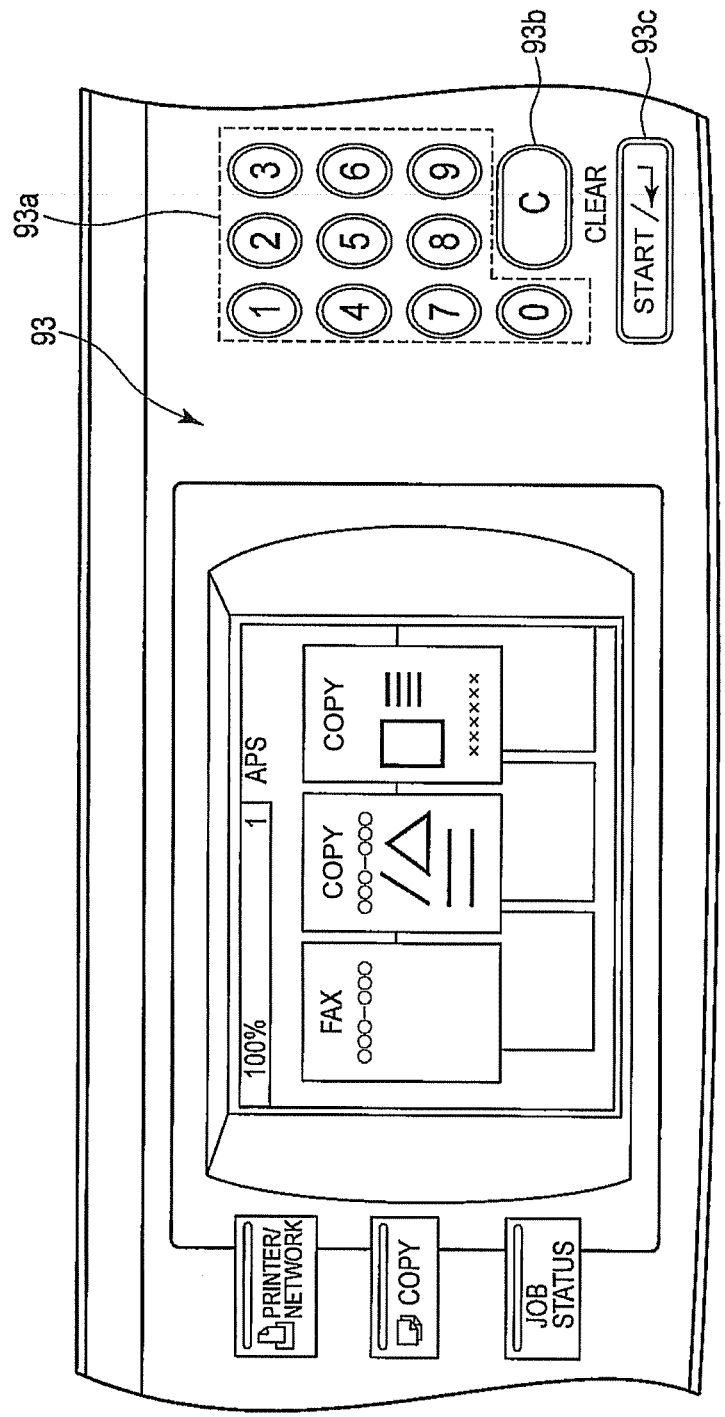
FIG. 10 is a diagram of an example of a form (panel display) of reuse in the image forming apparatus.

When the past job list "92-001" shown in FIG. 7 is displayed, the user selects thumbnail display via a "thumbnail" indication 92-100 displayed in a predetermined position in the touch panel (the display unit) 92. Then, for example, as shown in FIG. 10, a (present) past job is displayed in a thumbnail format. In this case, the user can easily select a past job from thumbnail images displayed by the touch panel.

For example, if a past job is a print job from a client (a PC), usually, the number of printed (output) copies is embedded in data compressed by a printer description language (XML, Postscript, PCL, etc.). Therefore, it is possible to easily change the number of printed (output) copies by rewriting a corresponding portion of the data to the number of copies that the user desires to print.

If a past job that the user desires to execute is a reading job, for example, scan to mail, the user sets anew a mail address to which the user desires to send a mail anew. In this case, a screen of the display unit (the touch panel) 92 can be displayed as a printer driver screen of a client terminal (a PC) as well through a network. The user can execute the past job in the client terminal after being authenticated.

In the standby state shown in FIG. 3, the following mode selection button indications are displayed: a "BASIC" indication 92-1 for enabling copying, an "EDIT" indication 92-2 for enabling setting of an editing mode such as partial erasing for scan data captured by the scanner unit 32 or received facsimile data, a "PROGRAM" indication 92-3 started up during addition, deletion, and update of a computer program, and a "SETTING" indication 92-4 for enabling, for example, a change of an operation condition (setting) for the user and the administrator. The indications shown in FIG. 3 are displayed on the basis of, for example, font data and GUI (Graphical User Interface) data (including display rules) stored by the memory unit 33. The data and the display rules (the GUI data) for the indications may be firmware of the MPU 91. The data and the display rules for the indications can be updated through, for example, the extended interface unit 73.

In FIG. 2, at the point when the MFP 1 can confirm that the user is a user who should be authenticated (i.e., a user who instructs reuse is a user who previously executed copying, output of a print, facsimile transmission, or the like of data to be reused) [1-2], the MFP 1 may directly display the past job list [92-001] explained with reference to FIG. 7.

According to the embodiment explained above, in execution of output of a print output, copying, facsimile transmission, scan to mail, and the like, image data used immediately before the execution (or used in the past within a fixed period) can be directly used. Therefore, it is easy to, for example, print additional materials or additionally copy materials. In facsimile transmission, scan to mail, and the like, it is unnecessary to repeatedly read image information of a document image. Therefore, complicated repeated operation is unnecessary and it is possible to improve convenience for the user.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming method comprising:
   specifying, by an apparatus, that a user authenticated by personal authentication is a user who previously executed copying, output of a print, facsimile transmission, or the like of completed job data, reuse of which is instructed by the user;
   searching, by the apparatus, for jobs, from the previously executed copying, output of a print, facsimile transmission, or the like of the completed job data;
   displaying, by the apparatus, a list of the jobs so that a job of the jobs can be selected from the list;
   selecting, by the apparatus, an arbitrary job from the list of jobs as a new job;
   displaying, by the apparatus, at least one execution condition of the new job that can be changed and input;
   in response to receiving input associated with the at least one execution condition:
      changing, by the apparatus, the at least one execution condition of the new job with respect to a new execution of the completed job data based on receiving input of the at least one execution condition; and
      displaying by the apparatus, the at least one execution condition when executing the new job; and
   in response to not receiving the input, displaying, by the apparatus, an alert message to prevent execution of a redundant job.

2. The image forming method of claim 1, wherein one of the conditions of the at least one condition that can be changed and input is a number of output copies.

3. The image forming method of claim 1, wherein one of the conditions of the at least one condition that can be changed and input is an address or a peculiar number of a transmission partner.

4. The image forming method of claim 1, further comprising:
   setting, by the apparatus, a period in which the job is stored.

5. The image forming method of claim 4, further comprising:
   changing, by the apparatus, the period in which the job is stored.

6. The image forming method of claim 4, further comprising,
   erasing or deleting, by the apparatus, the stored job after the period in which the job is stored ends.

7. The image forming method of claim 1, further comprising:
   storing job list data, by a database, to enable the previously executed copying, output of a print, facsimile transmission, or the like of the completed job data to be displayed as a list.

8. The image forming method of claim 1, further comprising:
   processing, by the apparatus, job list data to enable a thumbnail to be displayed.

* * * * *